US011829169B2

(12) United States Patent
Perry et al.

(10) Patent No.: US 11,829,169 B2
(45) Date of Patent: Nov. 28, 2023

(54) USB POWER DELIVERY MANAGEMENT

(71) Applicant: TEXAS INSTRUMENTS INCORPORATED, Dallas, TX (US)

(72) Inventors: John Mitchell Perry, McKinney, TX (US); Yoon Jae Lee, Allen, TX (US); Pasupathy Visuvanadan, Murphy, TX (US); Jeffrey Howard Enoch, Melissa, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/136,498

(22) Filed: Dec. 29, 2020

(65) Prior Publication Data

US 2021/0356978 A1 Nov. 18, 2021

Related U.S. Application Data

(60) Provisional application No. 63/024,929, filed on May 14, 2020.

(51) Int. Cl.
*G05F 1/46* (2006.01)
(52) U.S. Cl.
CPC .................................... *G05F 1/46* (2013.01)
(58) Field of Classification Search
None
See application file for complete search history.

(56) References Cited

U.S. PATENT DOCUMENTS

| 6,545,510 | B1* | 4/2003 | Cowles ............ G01R 19/16519 |
| | | | 327/76 |
| 8,987,934 | B2* | 3/2015 | De Haas ................... G05F 1/56 |
| | | | 307/9.1 |
| 9,690,641 | B2* | 6/2017 | Ozawa ....................... G06F 1/26 |
| 9,696,778 | B2* | 7/2017 | Motoki ...................... H02J 1/06 |
| 9,748,761 | B2* | 8/2017 | Ohwaki ............... H02H 3/0935 |
| 9,837,844 | B2* | 12/2017 | Balakrishnan ......... H02J 7/0068 |
| 11,079,784 | B2* | 8/2021 | Yun ........................ G11C 29/021 |
| 11,397,199 | B2* | 7/2022 | Lim ................. G01R 19/16538 |
| 11,467,196 | B2* | 10/2022 | Stark ................. G01R 19/16538 |
| 2013/0335043 | A1* | 12/2013 | He .......................... H02M 3/08 |
| | | | 323/234 |
| 2015/0106638 | A1* | 4/2015 | Sun ......................... G06F 1/266 |
| | | | 713/323 |
| 2019/0265766 | A1* | 8/2019 | Taniguchi ............. H02M 3/156 |
| 2019/0369689 | A1* | 12/2019 | Waters ................ G06F 13/4282 |

(Continued)

*Primary Examiner* — Thomas J. Hiltunen
(74) *Attorney, Agent, or Firm* — Michelle F. Murray; Frank D. Cimino

(57) ABSTRACT

In described examples, a source circuit can have an input and an output. The input can be adapted to be coupled to an input voltage source configured to provide an input voltage. The source circuit can be configured to output power at an output based on a power delivery mode. The source circuit can include a timer and power delivery (PD) controller. The PD controller can be configured to control the power delivery mode responsive to the input voltage and the timer. The PD controller can be further configured to set a respective power delivery mode and initiate the timer for a timer duration based on the input voltage relative to an input voltage threshold. The PD controller can be further configured to continue operating in the respective power delivery mode for the timer duration.

19 Claims, 7 Drawing Sheets

(56) References Cited

U.S. PATENT DOCUMENTS

| | | | |
|---|---|---|---|
| 2020/0310512 A1* | 10/2020 | Mills | G06F 1/3287 |
| 2021/0167615 A1* | 6/2021 | Sekimoto | H02J 7/00036 |
| 2022/0006287 A1* | 1/2022 | Bemat | H02H 3/22 |
| 2022/0037905 A1* | 2/2022 | Kitanosako | G06F 1/266 |

* cited by examiner

| 302 FIRST TIMER TRIGGER CONDITIONS | 304 INPUT VOLTAGE EVALUATION LOGIC WITH RESPECT TO THE FIRST TIMER | 306 POWER DELIVERY MODE AFTER FIRST TIMER EXPIRATION |
|---|---|---|
| THIRD THRESHOLD - RISING EDGE | IF VIN ≤ First_TH | NO POWER MODE |
| | IF First_TH < VIN ≤ Second_TH | LOW POWER MODE |
| | IF Second_TH < VIN < Third_TH | LOW POWER MODE |
| | IF VIN ≥ Third_TH | FULL POWER MODE STOP SECOND TIMER |
| SECOND THRESHOLD - FALLING EDGE | IF VIN ≥ Third_TH | FULL POWER MODE STOP SECOND TIMER |
| | IF Second_TH < VIN < Third_TH | FULL POWER MODE |
| | IF First_TH < VIN ≤ Second_TH | LOW POWER MODE START SECOND TIMER |
| | IF VIN ≤ First_TH | NO POWER MODE |

| 402 SECOND TIMER TRIGGER CONDITION | 404 INPUT VOLTAGE EVALUATION LOGIC WITH RESPECT TO THE SECOND TIMER | 406 POWER DELIVERY MODE DURING A PORTION OF A DURATION OF THE SECOND TIMER | 408 POWER DELIVERY MODE AFTER SECOND TIMER EXPIRATION |
|---|---|---|---|
| THRESHOLD - FALLING EDGE | IF VIN ≥ Third_TH | FULL POWER MODE | NO POWER MODE |
| | IF Second_TH < VIN < Third_TH | FULL POWER MODE | NO POWER MODE |
| | IF First_TH < VIN ≤ Second_TH | LOW POWER MODE | NO POWER MODE |
| | IF VIN ≤ First_TH | NO POWER MODE | NO POWER MODE |

USB POWER DELIVERY MANAGEMENT

CROSS-REFERENCE TO RELATED APPLICATION

This application claims priority from U.S. Provisional Patent Application Ser. No. 63/024,929, filed 14 May 2020, which is incorporated herein in its entirety.

TECHNICAL FIELD

This description generally relates to a power delivery (PD) controller, and, in particular, to a PD controller in a USB system.

BACKGROUND

USB PD and Type-C specifications enable power delivery over USB Type-C cables and connectors. A communication link is established between source and sink devices via a USB Type-C connector to enable the devices to communicate information and power based on the USB PD specification. The devices can deliver or sink power over the connector according to the USB PD specification. For example, to transfer power from the source device to the sink device, the source and sink devices send and receive PD messages across the communication link to negotiate (e.g., contract) a voltage and a current.

SUMMARY

In a described example, a system can include a source circuit that can have an input and an output. The input can be adapted to be coupled to an input voltage source configured to provide an input voltage. The source circuit can be configured to output power at the output based on a power delivery mode. The source circuit can include a timer and a PD controller. The PD controller can be configured to control the power delivery mode responsive to the input voltage and the timer. The PD controller is further configured to set a respective power delivery mode and to initiate the timer for a timer duration based on the input voltage relative to an input voltage threshold. The PD controller is further configured to continue operating in the respective power delivery mode for the timer duration.

In another described example, a source circuit can include an input terminal adapted to be coupled to an input voltage source configured to provide an input voltage. The source circuit can further include at least one voltage converter circuit that can include a first input, a second input, and an output. The first input of the at least one voltage converter circuit can be coupled to the input terminal. The source circuit can further include an output terminal that can be coupled to the output of the voltage converter circuit. The source circuit can further include a voltage sensing circuit that can include an input and an output. The input of the voltage sensing circuit can be coupled to the input terminal and to the first input of the at least one voltage converter circuit. The source circuit can include a PD controller that can include an input and an output. The input of the PD controller can be coupled to the output of the voltage sensing circuit, and the output of the PD controller can be coupled to the second input of the at least one voltage converter circuit. The PD controller can be configured to set a respective power delivery mode of the PD controller and initiate a timer for a timer duration based on the input voltage relative to an input voltage threshold. The PD controller can be further configured to continue operating in the respective power delivery mode for the timer duration.

In a further described example, a system can include a source circuit that can include an input and an output. The source circuit can include a voltage sensing circuit that can include an input and an output. The input of the voltage sensing circuit can be coupled to the input of the source circuit and configured to sense an input voltage that is provided by an input voltage source at the input of the source circuit. The source circuit can further include at least one voltage converter circuit that can include a first input, a second input, and an output. The input of the least one voltage converter circuit can be coupled to the input of the source circuit and the output of the least one voltage converter circuit can be coupled to the output of the source circuit. The least one voltage converter circuit can be configured to output a power at the output of the source circuit at a respective power level based on a power delivery mode and the input voltage. The source circuit can further include a PD controller comprising an input and an output. The input of the PD controller can be coupled to the output of the voltage sensing circuit to receive the input voltage and the output of the PD controller can be coupled to the second input to control the respective power level of the power being provided by the at least one voltage converter circuit. The PD controller can be configured to set a respective power delivery mode and initiate a timer for a timer duration based on the input voltage relative to an input voltage threshold. The PD controller can be further configured to provide a converter operating signal at the output to control the at least one voltage converter circuit to provide the power at the respective power level for the timer duration.

BRIEF DESCRIPTION OF THE DRAWINGS

FIG. 3 is a table showing example operations that can be implemented by an SPM module.

FIG. 4 is another table showing example operations that can be implemented by an SPM module.

DETAILED DESCRIPTION

Figure 1:
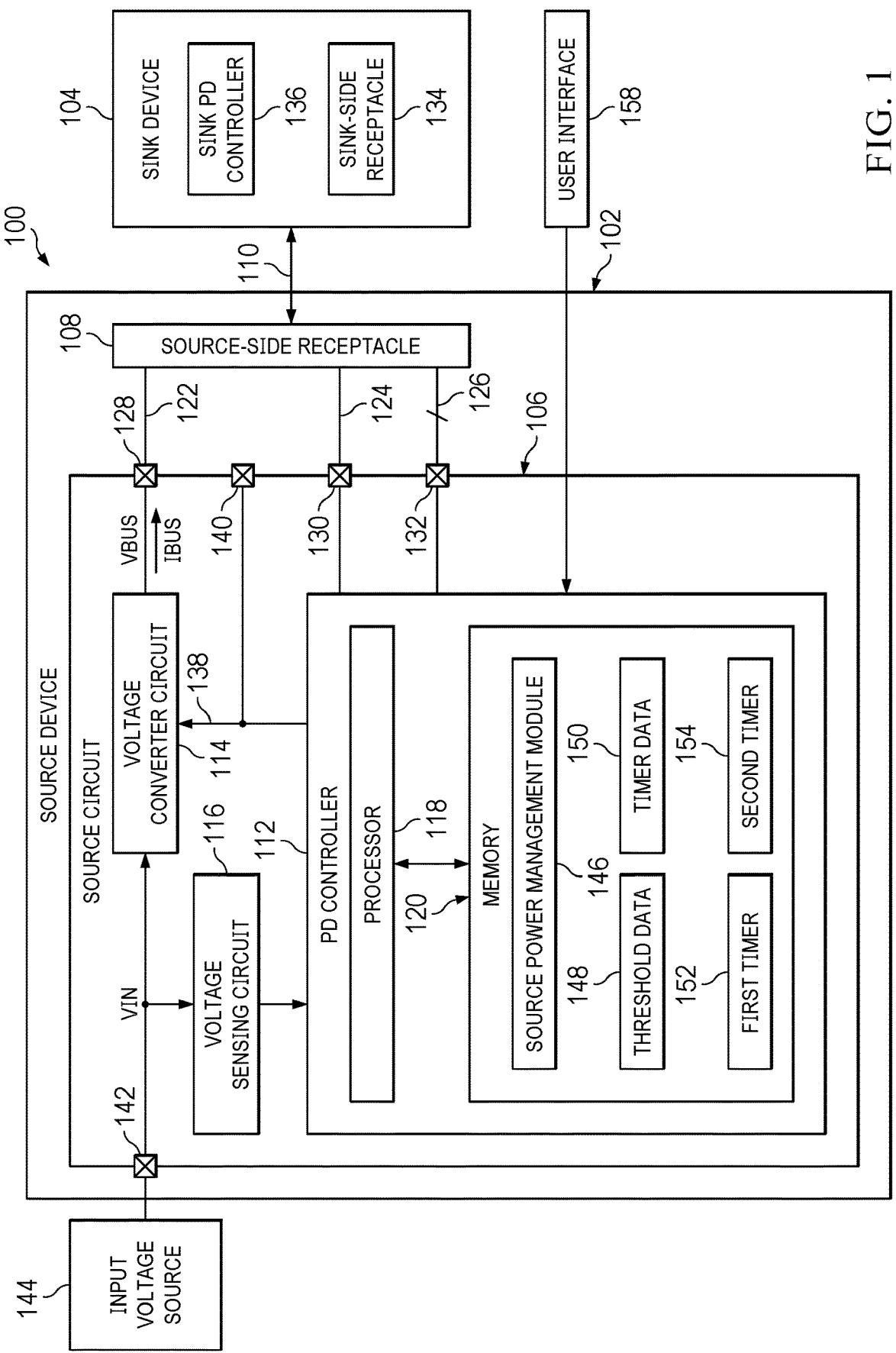
FIG. 1 is a block diagram of a USB connector system.

This description relates to PD management in USB connector systems, such as USB Type-C connector systems. USB connector systems are used in various systems to provide power and information to portable electronic devices, such as mobile phones, laptops, tablets, and other types of portable electronic devices. USB Type-C connector systems can be used in vehicles, such as head units, rear-seat charging systems, and rear-seat entertainment systems to allow for portable electronic device charging. For example, a USB Type-C connector system includes a PD controller to control power delivered to a connector (e.g., a receptacle or port) based on an input voltage provided by a battery source (e.g., a vehicle battery). Various changes in vehicle operating conditions, such as transitions between engine start and stop, can vary the input voltage received by the USB Type-C connector system. The input voltage variations can increase a likelihood of connector damage, battery source drainage, and/or result in unexpected loss of power for a connected electronic device.

Systems and methods are described herein for PD management in a USB connector system responsive to changes in the received input voltage, which may vary responsive to changes in vehicle operating conditions. For example, a PD controller of a source circuit includes a USB power management application. The USB power management application can be programmed to control a power delivery mode of the source circuit to control an amount of power delivered to a source-side receptacle for a sink device responsive to changes in the input voltage. The sink device can be coupled to the source-side receptacle through a cable or other connector to receive the power.

For example, the source circuit is configured to operate in different power delivery modes responsive to the input voltage. As described above, the input voltage may fluctuate responsive to vehicle transition conditions. The power delivery modes may include a low power delivery mode, a full power delivery mode, and no power delivery mode. The USB power management application can be programmed to evaluate a sensed input voltage relative to different input voltage thresholds and initiate a respective timer for a timer duration defined by timer data to operate the source circuit in a present power delivery mode. The source circuit includes a voltage sensing circuit to sense the input voltage. For example, the voltage sensing circuit is an analog-to-digital converter configured to provide a digital value of the sensed input voltage to the PD controller for controlling the power delivery mode of the source circuit. The USB power management application can be programmed to operate the source circuit in the present power delivery mode until the respective timer expires.

Accordingly, the PD controller described herein can be configured to control the power delivery mode of the source circuit based on the input voltage. In this way, the PD controller may reduce the likelihood of connector damage (e.g., source-side receptacle damage), vehicle battery drainage, or unexpected loss of connector power by maintaining the present power delivery mode for the source circuit for a period of time after the occurrence of a vehicle transition condition. Additionally, the systems and methods described herein should not be not limited or construed for power delivery management with respect to vehicle transition conditions. The systems and methods described herein can be used in any power delivery application for controlling the power being delivered to a system (e.g., circuit, device, apparatus, and the like) responsive to fluctuations in an input voltage being received by the system.

FIG. 1 is a block diagram of a USB connector system 100 that includes source and sink devices 102 and 104. For example, the USB connector system 100 operates according to the USB Type-C specification. As a further example, the source device 102 is part of a vehicle electronic system with which a user can interact (e.g., for power delivery) through one or more respective receptacles (e.g., USB ports). The source device may be implemented as a head unit (e.g., an entertainment system), a rear-seat charging system, a rear-seat entertainment system, or any electronic system of a vehicle. The sink device 104 may be a portable electronic device, such as a laptop, a mobile phone, a tablet, or any type of portable electronic device.

The source device 102 can include a source circuit 106 and a source-side receptacle 108. In the example of FIG. 1, the source device 102 includes the source circuit 106 and the source-side receptacle 108. In other examples, the source circuit 106 or the source-side receptacle 108 can be employed in another electronic system of the vehicle. Thus, For example, the source circuit 106 may be located outside of the source device 102 and be coupled through wiring, such as a wire harness, to the source-side receptacle 108. The source device 102 is coupled to the sink device 104 through a connector (e.g., a cable) 110. For example, the cable 110 is a USB Type-C compatible cable to couple the source and sink devices 102 and 104 to enable communication between the source and sink devices 102 and 104. The source circuit 106 can include a PD controller 112, a voltage converter circuit 114, and a voltage sensing circuit 116. An input of the voltage sensing circuit 116 is coupled to a first input of the voltage converter circuit 114. An output of the voltage sensing circuit 116 is coupled to an input of the PD controller 112.

For clarity and brevity purposes other circuit elements of the source circuit 106 have been omitted. However, the source circuit 106 can include additional components for operation of the source circuit 106 (e.g., a regulator, switches, passive components, resistive components, and the like). The PD controller 112 can include at least one processor 118 (e.g., a central processing unit (CPU)) and a memory 120. For example, the CPU is a complex instruction set computer (CISC)-type CPU, a reduced instruction set computer (RISC)-type CPU, a microcontroller unit (MCU), or a digital signal processor (DSP). The memory 120 can include random access memory (RAM). Alternatively, the memory 120 may include another type of memory device (e.g., on-processor cache, off-processor cache, RAM, flash memory, or disk storage). The memory 120 can store coded instructions (e.g., computer and/or machine readable instructions) programmed to implement a USB power management application that is executable by the processor 118. The processor 118 executes the USB power management application to operate the source circuit 106 in different power delivery modes responsive to changes in the input voltage.

For example, the source-side receptacle 108 has any type of terminal output that can transmit and receive data, power, and video through the cable 110. The source-side receptacle 108 is configured to provide electrical power from the source circuit 106 to the sink device 104 through the cable 110 at a power level responsive to the USB power management application. The source-side receptacle 108 can include terminals (e.g., 24-terminals) that can be electrically coupled through a bus line 122, a configuration channel (CC) line 124, and an auxiliary line 126 to a respective bus terminal 128, CC terminal 130, and auxiliary terminal 132 of the source circuit 106. In the example of FIG. 1, terminals 128, 130, and 132 are shown outside the PD controller 112. In other examples, terminals 128, 130, and 132 are part of the PD controller 112. A first output of the PD controller 112 is coupled to the CC terminal 130 and a second output of the PD controller 112 is coupled to the auxiliary terminal 132. The auxiliary line 126 can include one or more lines including a ground line, data lines, a cable power line (e.g., to power an integrated circuit within the cable 110) and for example additional communication lines. For example, the auxiliary terminal 132 may represent any number of one or more auxiliary terminals that can be coupled to respective lines represented by the auxiliary line 126. The sink-side receptacle 134 can be configured similarly to the source-side receptacle 108. The bus line 122, the CC line 124, and the auxiliary line 126 can be electrically coupled to respective terminals of the source-side receptacle 108. The terminals of the source-side receptacle 108 can be coupled through respective conductors of the cable 110 to respective terminals of the sink-side receptacle 134 to enable the source device 102 to communicate with the sink device 104.

The PD controller 112 is configured to monitor a voltage on the CC line 124 and detect when the sink device 104 is attached. For example, when the sink device 104 is attached, a sink PD controller 136 is electrically coupled to the CC line 124 through the cable 110. The sink PD controller 136 is configured to change (e.g., drop) the voltage on the CC line 124. The voltage change on the CC line 124 can be indicative of attaching the sink device 104 to the source-side receptacle 108. The PD controller 112 can employ the CC line 124 to communicate with the sink PD controller 136 of the sink device 104 to negotiate a PD contract responsive to detecting the sink device 104. The PD contract negotiation can determine an amount of power that the source circuit 106 is to provide to the sink device 104, such as for charging or use of the sink device 104. For example, the PD controller 112 can send PD messages to the sink PD controller 136 via the CC line 124 that can advertise a power level, acknowledge a receptacles' power level, and other PD control information. The PD controller 112 can be configured to advertise using a PD message current levels and voltages that the PD controller 112 can support. The sink PD controller 136 can process the PD message and notify the PD controller 112 via a reply PD message as to a sink current and voltage level for the sink device 104.

The PD controller 112 can be configured to control the voltage converter circuit 114 to provide power to the sink device 104 at the negotiated power level. For example, the PD controller 112 is configured to output at a second output a converter operating signal 138. The second output of the PD controller 112 can be coupled to a second input of the voltage converter circuit 114. The PD controller 112 is configured to communicate the converter operating signal 138 identifying the sink current and voltage level for the sink device 104 to the voltage converter circuit 114. For example, the converter operating signal 138 is provided to an output terminal 140. The second output of the PD controller 112 can be coupled to the output terminal 140. The output terminal 140 can be coupled to other circuitry to receive the converter operating signal 138. For example, the other circuitry includes one or more additional source circuits. The additional source circuits can be configured similar to the source circuit 106 to provide power to the respective source-side receptacles with which other sink devices can be coupled to receive the power at a respective power level.

For example, the voltage converter circuit 114 is configured to receive an input voltage VIN at a voltage input terminal 142 provided by an input voltage source 144. The input of the voltage sensing circuit 116 and the first input of the voltage converter circuit 114 can be coupled to the voltage input terminal 142. The voltage converter circuit 114 is configured to process the input voltage VIN based on the converter operating signal 138. The voltage converter circuit 114 can be configured to provide at an output a bus voltage VBUS at the bus terminal 128 and a bus current IBUS to the bus terminal 128. The bus voltage VBUS is provided based on the sink voltage level. The bus current IBUS is provided based on the sink current level. The bus current IBUS can be provided from the bus terminal 128 via the bus line 122 to the source-side receptacle 108. The cable 110 can deliver the bus current IBUS to the sink-side receptacle 134 to provide the sink device 104 with the power. Accordingly, the PD controller 112 is configured to control a power level of the voltage converter circuit 114 to control the power provided by the source circuit 106 (e.g., an amount of power being provided by the voltage converter circuit 114 to the source-side receptacle 108). The input voltage source 144 can be a battery of the vehicle, and thus the input voltage VIN is a direct current (DC) input voltage. For example, the voltage converter circuit 114 is a DC-to-DC converter circuit.

For example, because automotive battery supply lines are prone to voltage transient events, the input voltage VIN provided to the source circuit 106 can change abruptly, responsive to changes in vehicle operating conditions. For example, transitions between vehicle operating conditions cause the voltage transient events. The term "vehicle transition condition" as used herein can refer to a change in vehicle operating condition from a first vehicle state to a second vehicle state that introduces or causes an output voltage (e.g., the input voltage VIN) being provided by a battery of the vehicle to abruptly change. For example, the vehicle transition condition is changed from an engine stop (off) condition to an engine start (on) condition. A change in a vehicle operating condition can abruptly change the input voltage VIN and the source circuit 106 can be damaged (e.g., by damaging internal circuitry of the voltage converter circuit 114, such as switches). In another example, the bus voltage VBUS can be caused to exceed a voltage rating of the bus line 122, which can lead to a fuse of the vehicle being blown or damaged. For example, the vehicle transition condition causes the source circuit 106 to drain the input voltage source 144 or causes the source-side receptacle 108 to be damaged or lose power, either of which may reduce a user's experience at the sink device 104.

In an example, when system 100 is implemented in a vehicle, the PD controller 112 is configured to implement USB power management to mitigate the effects of vehicle transition conditions, such as engine start and stop conditions. For example, the PD controller 112 includes a source power management (SPM) module 146 programmed to control a power delivery mode of PD controller 112 and thus the source circuit 106 based on the input voltage VIN, which may vary responsive to changes in the vehicle operating conditions. Examples of power delivery modes include a full power delivery mode, a low power delivery mode, and no power delivery mode. The SPM module 146 can be programmed to keep the power being provided source circuit 106 constant for a timer duration, as described herein by causing the source circuit 106 to continue operating in a present power delivery mode for the timer duration responsive to the vehicle transition condition. The voltage sensing circuit 116 is configured to sense the input voltage VIN and provide a signal representative of the sensed input voltage VIN to the PD controller 112. For example, the voltage sensing circuit 116 includes an analog-to-digital converter to provide a digital value representative of the input voltage VIN to the PD controller 112. The voltage sensing circuit 116 can be configured to sample the input voltage VIN at a sampling interval.

For example, the SPM module 146 is programmed to set a respective power delivery mode for the source circuit 106 based on threshold data 148 and timer data 150 stored in the memory 120. The threshold data 148 can specify different input voltage thresholds for the input voltage VIN. For example, the threshold data 148 includes a first input voltage threshold, a second input voltage threshold, and a third input voltage threshold. The third input voltage threshold can be greater than the second input voltage threshold which can be greater than the first input voltage threshold. The timer data 150 identifies a first timer duration and a second timer duration. The first timer duration can be employed by the SPM module 146 to program a first timer 152. The second timer duration can be employed by the SPM module 146 to program a second timer 154. In the example of FIG. 1, the first and second timers 152 and 154 are shown as implemented as coded instructions and being stored in the memory 120. In another example, the first timer 152 and/or the second timer 154 are implemented as circuitry, which can be part of the PD controller 112 or external to the PD controller 112. For example, the different input voltage thresholds for the input voltage VIN and the first and second timer durations of the timer data 150 for the first and second timers 152 and 154 may be programmable. For example, a user interface 156 is employed to provide the threshold data 148 and the timer data 150.

The SPM module 146 can be programmed to evaluate the input voltage VIN relative to the threshold data 148 and the timer data 150 to control the power delivery mode of the source circuit 106. For example, the SPM module 146 can be programmed to evaluate the input voltage VIN relative to different input voltage thresholds of the threshold data 148 and initiate a respective timer of the first and second timers 152 and 154. The SPM module 146 can be programmed to control the PD controller 112 to operate in the present power delivery mode for a timer duration of the respective timer. The SPM module 146 is programmed to control the PD controller 112 to remain in the present power delivery mode for the timer duration of the respective timer based on a comparison of the input voltage VIN relative to the threshold data 148.

As a further example, the SPM module 146 is programmed to initiate the first timer 152 responsive to determining that the input voltage VIN sensed by the voltage sensing circuit 116 is equal to the third input voltage threshold. For example, where the system 100 is implemented in a vehicle, the initiation of the first timer 152 when the input voltage VIN is equal to the third input voltage threshold indicates an engine start condition. In another example, the SPM module 146 is programmed to initiate the first timer 152 responsive to determining that the input voltage VIN is less than or equal to the second input voltage threshold. For the example where the system 100 is implemented in a vehicle, the initiation of the first timer 152 when the input voltage VIN is equal to the second input voltage threshold indicates an engine off condition. During a time period defined by the first time duration, the SPM module 146 is programmed to maintain the source circuit 106 in the present power delivery mode regardless of further variations in VIN during the first time. Thus, in contrast to some existing control methods, the source circuit 106 is not forced to operate at a different power delivery level responsive to fluctuations in VIN that may occur during engine start and stop conditions. Instead, the SPM module 146 can control the source circuit 106 to maintain the present power delivery level instead of abruptly exiting the present power delivery level responsive to the vehicle transition conditions.

While the first timer 152 is counting, for example, the PD controller 112 is configured to receive the sensed input voltage VIN from the voltage sensing circuit 116. The sensed input voltage VIN receive by the PD controller 112 before the first timer 152 has expired can be referred to herein as a first timer sample of the input voltage VIN. The SPM module 146 can be programmed to control the power delivery mode of the source circuit 106 based on the first timer sample of the input voltage VIN and the threshold data 148 responsive to when the first timer 152 expires. For example, the SPM module 146 is programmed to control the PD controller 112 to operate in the present power delivery mode or transition to a different power delivery mode, such as the low power delivery mode or the full power delivery mode.

For example, the SPM module 146 is programmed to control the PD controller 112 to operate in the low power delivery mode responsive to determining that the first timer sample of the input voltage VIN is greater than the first input voltage threshold and is less than or equal to the second input voltage threshold responsive to the expiration of the first timer 152. For example, the SPM module 146 is programmed to control the PD controller 112 to operate in the high power delivery mode responsive to determining that the first timer sample of the input voltage VIN is greater than or equal to the third input voltage threshold responsive to the expiration of the first timer 152. For example, the SPM module 146 is programmed to control the PD controller 112 to operate in the high power delivery mode responsive to determining that the first timer sample of the input voltage VIN is greater than the second input voltage threshold but is less than the third input voltage threshold responsive to the expiration of the first timer 152. For example, the SPM module 146 is programmed to initiate the second timer 154 responsive to determining that the first timer sample of the input voltage VIN is greater than the first input voltage threshold but is less than or equal to the second input voltage threshold responsive to the expiration of the first timer 152, as described herein. For example, the SPM module 146 is programmed to control the PD controller 112 to operate in the no power delivery mode responsive to determining that the first timer sample of the input voltage VIN is less than or equal to the first input voltage threshold responsive to the expiration of the first timer 152.

For example, the SPM module 146 is programmed to initiate the second timer 154 responsive to determining that the respective sample of the input voltage VIN is equal to the first input voltage threshold. During a time period defined by the second timer duration, the SPM module 146 can be programmed to continue operating the source circuit 106 in the present power delivery mode, such as the low power delivery mode. The input voltage VIN sensed during the time period defined by the second timer duration of the second timer 154 can be referred to herein as a second timer sample of the input voltage VIN. The SPM module 146 can be programmed to evaluate the second timer sample of the input voltage VIN to the input voltage thresholds to control the power delivery mode of the source circuit 106 for a remaining duration of the time period defined by the second timer duration. For example, the SPM module 146 is programmed to control the PD controller 112 to operate in the no power delivery mode for the remaining duration of the second timer 154 responsive to determining that the second timer sample of the input voltage VIN is less than or equal to the first input voltage threshold. Thus, the SPM module 146 keeps the source circuit 106 in the present power delivery mode for the time period defined by the second timer duration instead of abruptly exiting the present power delivery mode.

Accordingly, the SPM module 146 can be programmed to employ the threshold data 148 and the timer data 150 to control power delivery modes of the PD controller 112 and thus the source circuit 106, such as responsive to vehicle transition conditions, in examples wherein the system 100 is implemented in a vehicle.

During the full power delivery mode, the PD controller 112 can be configured to provide the voltage converter circuit 114 with the converter operating signal 138 identifying the current and voltage level for the sink device 104 to control the voltage converter circuit 114 to provide power to the source-side receptacle 108 at a first power level. For example, during the full power delivery mode, the PD controller 112 is configured to provide the voltage converter circuit 114 with the converter operating signal 138 identifying the current and voltage level for the sink device 104 that has been negotiated, as described herein. The voltage converter circuit 114 can be configured to provide the power to the source-side receptacle 108 at the first power level. The voltage converter circuit 114 can be configured to provide the bus voltage and current VBUS and IBUS to the bus terminal 128 based on the voltage and current level of the converter operating signal 138.

During the low power delivery mode, the source circuit 106 can be configured to deliver power to the source-side receptacle 108 at a reduced power level (e.g., a second power level that is less than the first power level). For example, during the low power delivery mode, the SPM module 146 is programmed to instruct the PD controller 112 to re-negotiate the PD contract with the sink PD controller 136 of the sink device 104. The PD controller 112 can be configured to provide the voltage converter circuit 114 with the converter operating signal 138 identifying the respective current and/or voltage level to control the voltage converter circuit 114 to deliver power to the source-side receptacle 108 at the second power level. For example, the PD controller 112 is configured to control the voltage converter circuit 114 to provide the bus voltage and current VBUS and IBUS to the bus terminal 128 based on the respective current level and/or voltage.

During the no power delivery mode, the source circuit 106 can be configured to stop outputting the power to the source-side receptacle 108 at the first power level or the second power level. For example, during the no power delivery mode, the SPM module 146 is programmed to control the PD controller 112 to re-negotiate the PD contract with the sink PD controller 136 of the sink device 104, as described herein. The PD controller 112 can be configured to provide the voltage converter circuit 114 with the converter operating signal 138 to turn off the voltage converter circuit 114 and cease outputting the power to the source-side receptacle 108. For example, the PD controller 112 is configured to control the voltage converter circuit 114 to stop providing the bus voltage VBUS and thus the bus current IBUS to the bus terminal 128.

In view of the foregoing, the PD controller 112 of source circuit 106 employs a USB power management application (e.g., the SPM module 146, the threshold data 148, the timer data 150, the first timer 152, and the second timer 154) to control the power delivery mode of the source circuit 106 based on the input voltage VIN. As described above, VIN may vary with respect to time responsive to vehicle transition conditions. The USB power management application can control the PD controller 112 and thus the source circuit 106 to continue operating in a present power delivery level as the input voltage VIN fluctuates responsive to vehicle transitions to mitigate or reduce connector damage (e.g., source-side receptacle damage), drainage of a vehicle battery (e.g., the input voltage source 144), or unexpected loss of connector power for the sink device 104. Moreover, configuring the source circuit 106 with the USB power management application does not require the use of an external controller and/or external components to detect and respond to changes in the input voltage VIN. Thus, no additional circuitry is needed for detection and responding to input voltage fluctuations responsive to vehicle transition conditions. Furthermore, no additional protocols or circuit components are needed for communication between the PD controller 112 and the sink PD controller 136.

Figure 2:
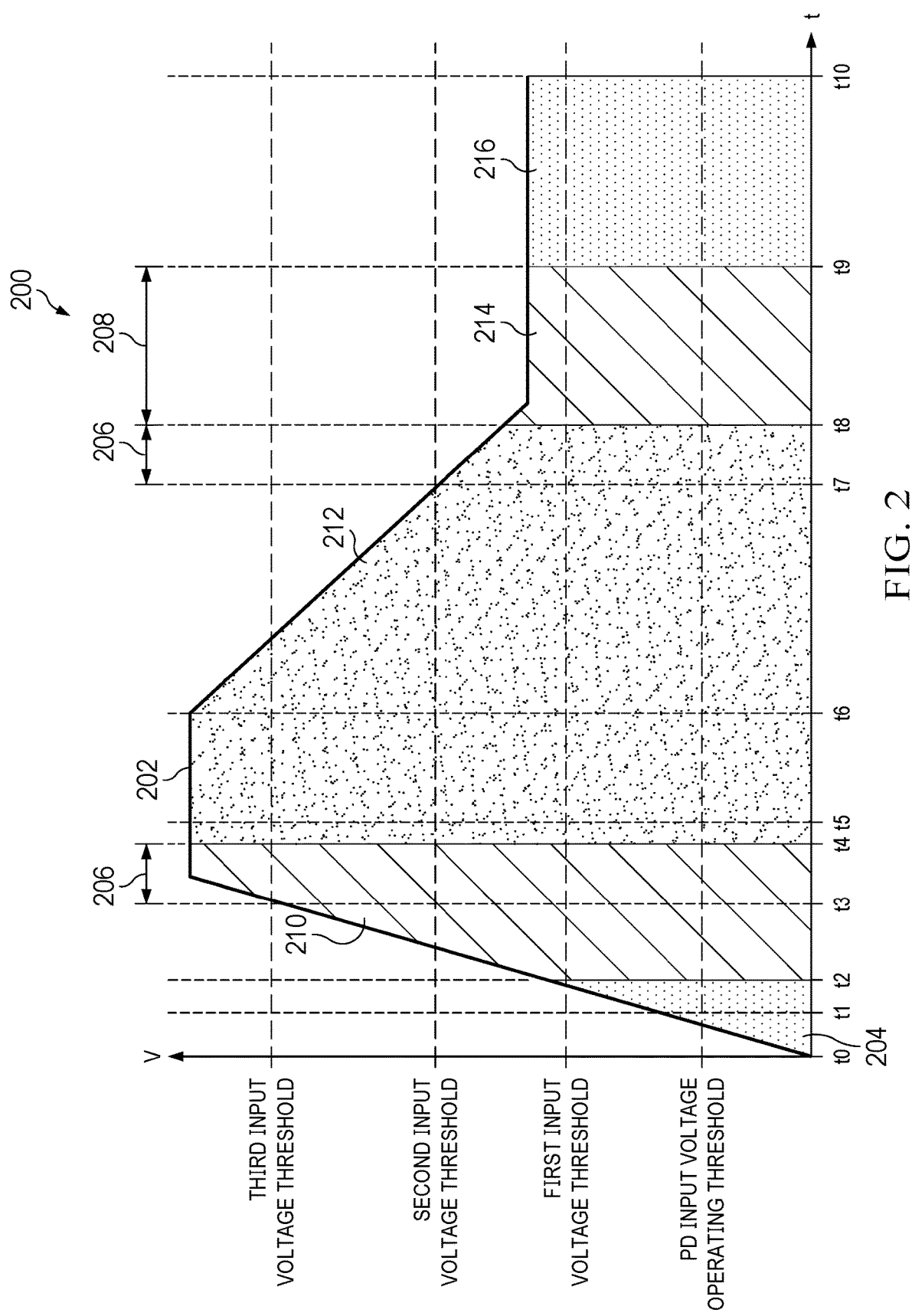
FIG. 2 is an example graph of voltage over time showing different power delivery modes that may be implemented by a source circuit.

FIG. 2 is an example graph 200 of voltage over time showing different power delivery modes that may be implemented by a source circuit, such as the source circuit 106 shown in FIG. 1. Therefore, the following description of FIG. 2 also refers to FIG. 1. As shown in the example of FIG. 2, a y-axis of graph 200 represents an amplitude axis in volts (V) and an x-axis of graph 200 represents a time axis in time (t). As shown, the graph 200 includes a first input voltage threshold, a second input voltage threshold, and a third input voltage threshold, and a PD input voltage operating threshold. The first, second, and third input voltage thresholds can be stored in the memory 120 of the PD controller 112 as the threshold data 148, as described herein. The PD input voltage operating threshold is a minimum activation voltage for the source circuit 106 to operate. As shown in the example of FIG. 2, the third input voltage threshold is greater than the second input voltage threshold. The second input voltage threshold is greater than the first input voltage threshold, and the first input voltage threshold is greater than the PD input voltage operating threshold.

For example, at about a time t0, the source circuit 106 is not electrically coupled to the battery of the vehicle and thus is deactivated. As such, the source circuit 106 provides no power to the source-side receptacle 108 for the sink device 104. At about a time t1, the input voltage VIN 202 can equal the PD input voltage operating threshold, and the source circuit 106 is activated; however, the source circuit 106 provides no power to the source-side receptacle 108. At about the time t1, the PD controller 112 can implement the USB power management application stored in the memory 120, as described herein. The SPM module 146 can be programmed to evaluate samples of the input voltage VIN 202 over time relative to the first, second, and third input voltage thresholds for setting the power delivery mode of the source circuit 106, as described herein.

For example, at about the time t2, the SPM module 146 is programmed to cause the source circuit 106 to operate in a low power delivery mode. A first power region 204 under the input voltage VIN 202 between the time t0 and the time t2 can be indicative of a first power delivery mode. In the first power delivery mode, the source circuit 106 is configured to provide no power to the source-side receptacle 108 for the sink device 104. At about a time t3, the first timer 152 can be initiated. The first timer 152 can be programmed with a first timer duration 206. The second timer 154 can be programmed with a second timer duration 208 that is less than the first timer duration 206. In an example, the first timer duration 206 can have a respective time duration that can start at about a time t3 and end at about a time t4, as shown in FIG. 2. In another example, the first timer duration 206 can have a respective time duration that can start at about a time t7 and end at about a time t8. In another example, the second timer duration 208 can have a respective time duration that can start at about the time t8 and end at about a time t9.

The SPM module 146 can be programmed to evaluate samples of the input voltage VIN 202 to determine whether the source circuit 106 is to operate in the low power delivery mode or a full power delivery mode. For example, the SPM module 146 is programmed to control the PD controller 112 to operate in the low power delivery mode responsive to determining that the respective sample of the input voltage VIN 202 is greater than the first input voltage threshold but is less than or equal to the second input voltage threshold.

For example, the SPM module 146 is programmed to control the PD controller 112 to operate in the low power delivery mode responsive to determining that the respective sample of the input voltage VIN 202 is greater than the second input voltage threshold but is less than the third input voltage threshold.

At about the time t3, the SPM module 146 can be programmed to initiate the first timer 152 responsive to determining that the input voltage VIN 202 is greater than or equal to the third input voltage threshold. For example, when the input voltage VIN 202 is greater than or equal to the third input voltage threshold indicates the engine start condition. The SPM module 146 can be programmed to operate the source circuit 106 in the present power delivery mode. Thus, the source circuit 106 can be controlled to continue operating in the low power delivery mode for the first timer duration 206, as shown in FIG. 2. The SPM module 146 can be programmed to control the PD controller 112 to continue operating in the low power delivery mode between about the time t3 to about the time t4, as shown in FIG. 2. A second power region 210 under the input voltage VIN 202 between the time t2 and time t4 can be indicative of the second power delivery mode. In the second power delivery mode, the source circuit 106 is configured to provide a reduced amount of power to the source-side receptacle 108 for the sink device 104.

For example, at about the time t4, the first timer 152 expires. The SPM module 146 can be programmed to evaluate the respective sample of the input voltage VIN 202 sampled between the time t4 and the time t5 responsive to the first timer 152 expiring. Because the sensed input voltage VIN 202 is greater than or equal to the third input voltage threshold at about the time t4, the SPM module 146 is programmed to control the PD controller 112 to operate in the full power delivery mode. A third power region 212 under the input voltage VIN 202 between the time t4 and a time t8 can indicate a third power delivery mode. In the third power delivery mode, the source circuit 106 is configured to provide a full amount of power to the source-side receptacle 108 for the sink device 104.

For example, between a time t6 and a time t7 the input voltage VIN 202 decreases from a first input voltage value above the third threshold to a second input voltage value equal to the second input voltage threshold. The decrease in the input voltage VIN between t6 and t7 can be responsive to a transition to the engine stop condition. The SPM module 146 can be programmed to initiate the first timer 152 responsive to determining that the input voltage VIN 202 has decreased to the second input voltage threshold. The SPM module 146 can be programmed to control the PD controller 112 to continue operating in the high power delivery mode for the first timer duration 206 of the first timer 152.

For example, at about the time t8, the first timer 152 expires. At about the time t8, the SPM module 146 can be programmed to evaluate the sensed sample of the input voltage VIN 202. Because the sensed sample of the input voltage VIN 202 is less than or equal to the second input voltage threshold at about the time t8, the SPM module 146 is programmed to control the PD controller 112 to operate in the low power delivery mode. At about the time t8, the SPM module 146 can be programmed to initiate the second timer 154 responsive to determining that the input voltage VIN 202 is equal to the first input voltage threshold. In other examples, at about the time t8, the SPM module 146 can be programmed to initiate the second timer 154 responsive to the first timer expiring 152.

The SPM module 146 can be programmed to control the PD controller 112 to operate in the low power delivery mode for the second timer duration 208 of the second timer 154 that can start at about the time t8 to about a time t9. A fourth power region 214 under the input voltage VIN 202 between the time t8 and the time t9 can be indicative of a fourth power delivery mode. In the fourth power delivery mode, the source circuit 106 provides a reduced amount of power to the source-side receptacle 108 for the sink device 104 similar to the second power region 210. For example, the SPM module 146 is programmed to evaluate the input voltage VIN 202 between the time t8 and the time t9 which is during the second timer duration 208 of the second timer 154.

The SPM module 146 is programmed to determine whether the source circuit 106 is to operate in the low power delivery mode responsive to the evaluation. For example, the SPM module 146 is programmed to control the PD controller 112 to operate in the low power delivery mode responsive to determining that the respective input voltage VIN 202 sampled between the time t8 and the time t9 is greater than the first input voltage threshold but is less than or equal to the second input voltage threshold. As shown in the example of FIG. 2, the second timer 154 expires at about the time t9. The SPM module 146 can be programmed to control the PD controller 112 to operate in the no power delivery mode responsive to the expiration of the second timer 154. A fifth power region 216 under the input voltage VIN 202 between the time t9 and a time t10 can be indicative of a fifth power delivery mode. In the fifth power delivery mode, the source circuit 106 is configured to provide no power to the source-side receptacle 108 for the sink device 104 similar to the first power region 204.

FIG. 3 is a table 300 showing example operations that can be implemented by the SPM module 146, as shown in FIG. 1. Therefore, the following description of FIG. 3 also refers to FIGS. 1 and 2. The table 300 includes a first column 302 that represents a first trigger condition (identified as "Third Threshold—Rising Edge" in the table 300) for initiating the first timer 152 according to the third input voltage threshold with respect to a rising edge of the input voltage VIN 202, as shown in FIG. 2. The first column 302 also represents a second trigger condition (identified as "Second Threshold—Falling Edge" in the table 300) for initiating the first timer 152 according to the second input voltage threshold as shown on a falling edge of the input voltage VIN 202 of the graph 200, as shown in FIG. 2. The table 300 includes a second column 304 that represents logic (e.g., instructions) that can be implemented by the SPM module 146 for evaluating the input voltage VIN 202 sampled before the first timer 152 expires to control the power delivery mode of the source circuit 106. In the second column 304, the first input voltage threshold is identified as "First_TH", the second input voltage threshold is identified as "Second_TH" and the third input voltage threshold is identified as "Third_TH." The table 300 includes a third column 306 that represents a respective power delivery mode in which the source circuit 106 is to operate responsive to the expiration of the first timer 152 and a respective logic condition of the second column 304. For example, the PD controller 112 is configured to operate the source circuit 106 in the full power operating mode responsive to determining that the input voltage VIN 202 is greater than or equal to the third input voltage threshold.

FIG. 4 is another table 400 showing example operations that can be implemented by the SPM module 146, as shown in FIG. 1. Therefore, the following description of FIG. 4 also refers to FIGS. 1 and 2. The table 400 includes a first column 402 that represents a trigger condition (identified as "Threshold—Falling Edge" in FIG. 4). The SPM module 146 uses the trigger condition for initiating the second timer 154 according to the second input voltage threshold as shown on a falling edge of the input voltage VIN 202, as shown in FIG. 2. The table 400 includes a second column 404 that represents logic (e.g., instructions) that can be implemented by the SPM module 146 for evaluating the input voltage VIN 202 sensed during the second timer duration 208 of the second timer 154, as shown in FIGS. 1 and 2. In the second column 404, the first input voltage threshold is identified as "First_TH", the second input voltage threshold is identified as "Second_TH" and the third input voltage threshold is identified as "Third_TH." The table 400 includes a third column 406 that represents a respective power delivery mode in which the source circuit 106 is to operate during a remaining time duration of the second timer 154 based on a respective logic condition shown in the second column 404. For example, the PD controller 112 is configured to operate the source circuit 106 in the full power operating mode responsive to determining that a respective sample of the input voltage VIN 202 is greater than or equal to the first input voltage threshold during the remaining time duration of the second timer 154. The fourth column 408 identifies a respective power delivery mode in which the source circuit 106 is to operate responsive to the expiration of the second timer 154.

Figure 5:
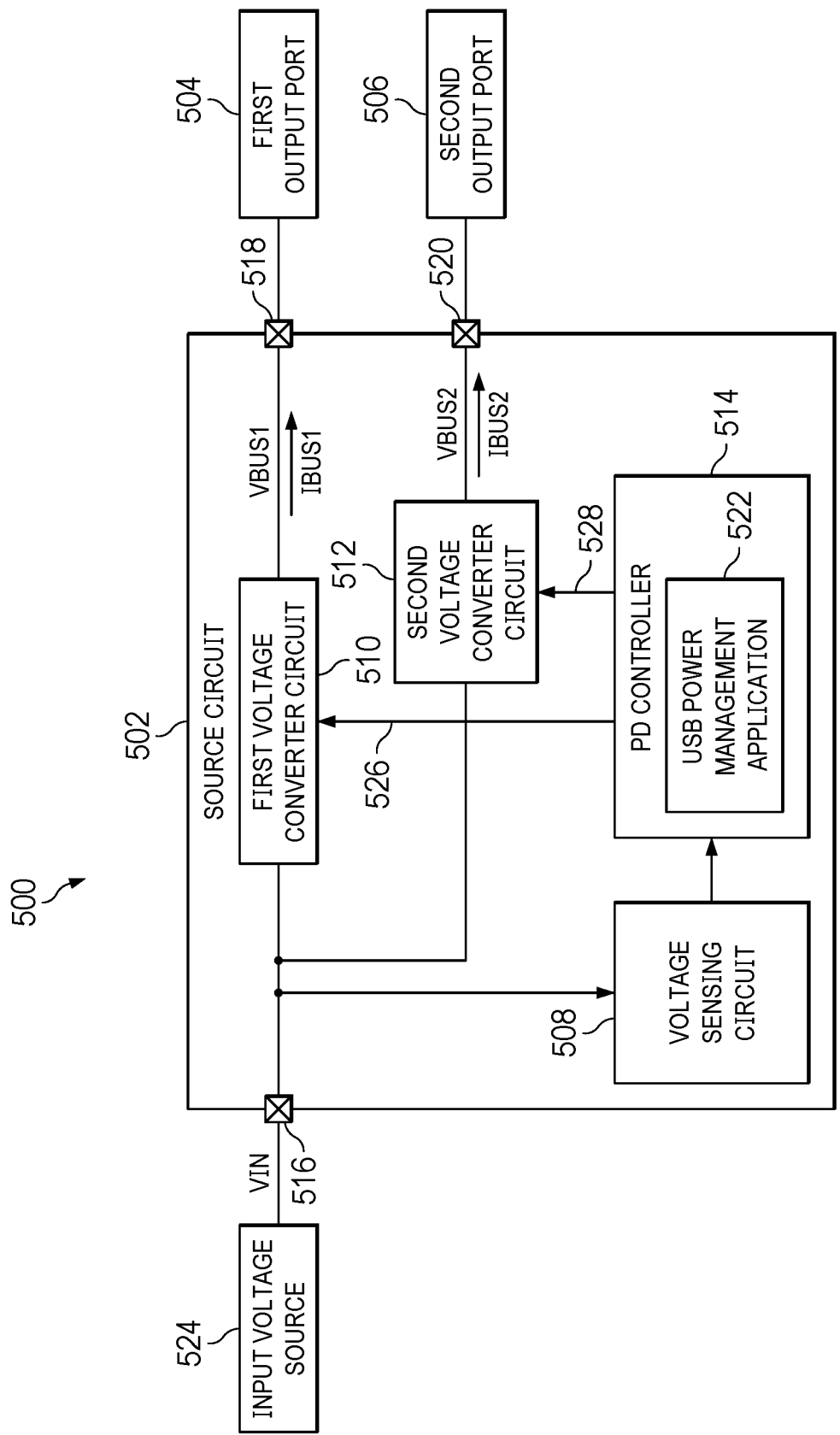
FIG. 5 is a block diagram of another USB connector system.

FIG. 5 is a block diagram of a USB connector system 500 that includes a source circuit 502 and first and second output ports 504 and 506. The source circuit 502 includes a voltage sensing circuit 508, a first voltage converter circuit 510, a second voltage converter circuit 512, and a PD controller 514. Respective first inputs of the first and second voltage converter circuits 510 and 512 are coupled to an input terminal 516. An input of the voltage sensing circuit 508 is coupled to the respective first inputs of the first and second voltage converter circuits 510 and 512 and the input terminal 516. An output of the voltage sensing circuit 508 is coupled to an input of the PD controller 514. Respective first and second outputs of the PD controller 514 are coupled to respective second inputs of the first and second voltage converter circuits 510 and 512. Respective outputs of the first and second voltage converter circuits 510 and 512 are coupled to respective first and second output terminals 518 and 520. Respective outputs of the first and second output ports 504 and 506 are coupled to the respective first and second output terminals 518 and 520. For example, the first and second output ports 504 and 506 are useful examples of the source-side receptacle 108, shown, as shown in FIG. 1.

The PD controller 514 can be configured similar to the PD controller 112, as shown in FIG. 1. To mitigate the effects of vehicle transition conditions, such as engine start and stop conditions, the PD controller 514 implements a USB power management application 522 based on the input voltage VIN, as described herein. For example, the PD controller 514 is configured to control a power delivery mode of the source circuit 502 based on an input voltage VIN received at the input terminal 516 responsive to vehicle transition conditions. The input voltage VIN can be provided by an input voltage source 524, such as a battery of the vehicle. The PD controller 514 is configured to control the respective first and second voltage converter circuits 510 and 512 based on the power delivery mode (e.g., to set an amount of power being provided by each of the voltage converter circuits 510 and 512). The voltage sensing circuit 508 can be configured to sample the input voltage VIN at the input terminal 516 and provide an output to the input of the PD controller 514 representing the sensed input voltage VIN. The USB power management application 522 can be programmed to control the power delivery mode of the source circuit 502 based on the output from the voltage sensing circuit 508.

For example, the USB power management application 522 can be programmed to control the PD controller 514 to operate in a full power delivery mode for a first timer duration (e.g., the first timer duration 206, as shown in FIG. 2) of a first timer (e.g., the first timer 152, as shown in FIG. 1) based on the input voltage VIN, as described herein. The USB power management application 522 can be programmed to control the PD controller 514 to operate in the full power delivery mode based on the input voltage responsive to a vehicle transition condition (e.g., an engine start condition). The PD controller 514 can be configured to provide the respective second inputs of the first and second voltage converter circuits 510 and 512 with the respective converter operating signals 526 and 528 to control the PD controller 514 to operate in the full power delivery mode. The respective converter operating signals 526 and 528 can identify a respective current and voltage level for delivering power to the respective first and second output ports 504 and 506 at a respective power level responsive to the vehicle transition condition. For example, the PD controller 514 is configured to control each of the first and second voltage converter circuits 510 and 512 to provide the bus voltage and current VBUS1 and VBUS2, IBUS1 and IBUS2 to respective output terminals 518 and 520 based on the respective current and voltage level. Accordingly, during the full power delivery mode, the PD controller 514 can be configured to control the source circuit 502 to provide each of the first and second output ports 504 and 506 with power at a first power level responsive to the vehicle transition condition.

In another example, the USB power management application 522 is programmed to control the PD controller 514 to operate in a low power delivery mode for a second timer duration (e.g., the second timer duration 208, as shown in FIG. 2) of a second timer (e.g., the second timer 154, as shown in FIG. 1) based on the input voltage VIN, as described herein. The USB power management application 522 can be programmed to control the PD controller 514 to operate in the low power delivery mode based on the input voltage VIN responsive to the vehicle transition condition (e.g., an engine stop condition). The PD controller 514 can be configured to control the first and second voltage converter circuits 510 and 512 to provide the bus voltages and currents VBUS1 and VBUS2, IBUS1 and IBUS2 to respective output terminals 518 and 520 based on the respective converter operating signals 526 and 528. Accordingly, during the low power delivery mode, the PD controller 514 can be configured to control the source circuit 502 to provide each of the first and second output ports 504 and 506 with power at a second power level responsive to the vehicle transition condition.

As another example, the USB power management application 522 is programmed to control the PD controller 514 to operate in a no power delivery mode responsive to the expiration of the second timer. The PD controller 514 can be configured to provide the respective second inputs of the first and second voltage converter circuits 510 and 512 with the respective converter operating signals 526 and 528 indicative of no power to control the source circuit 502. The first and second voltage converter circuits 510 and 512 can be configured to cease outputting power to each respective first and second output ports 504 and 506 at the first or second power levels based on the converter operating signals 526 and 528. Accordingly, during the no power delivery mode, the PD controller 514 can be configured to control the source circuit 502 to stop providing the first and second output ports 504 and 506 with power at the first or the second power levels.

Figure 6:
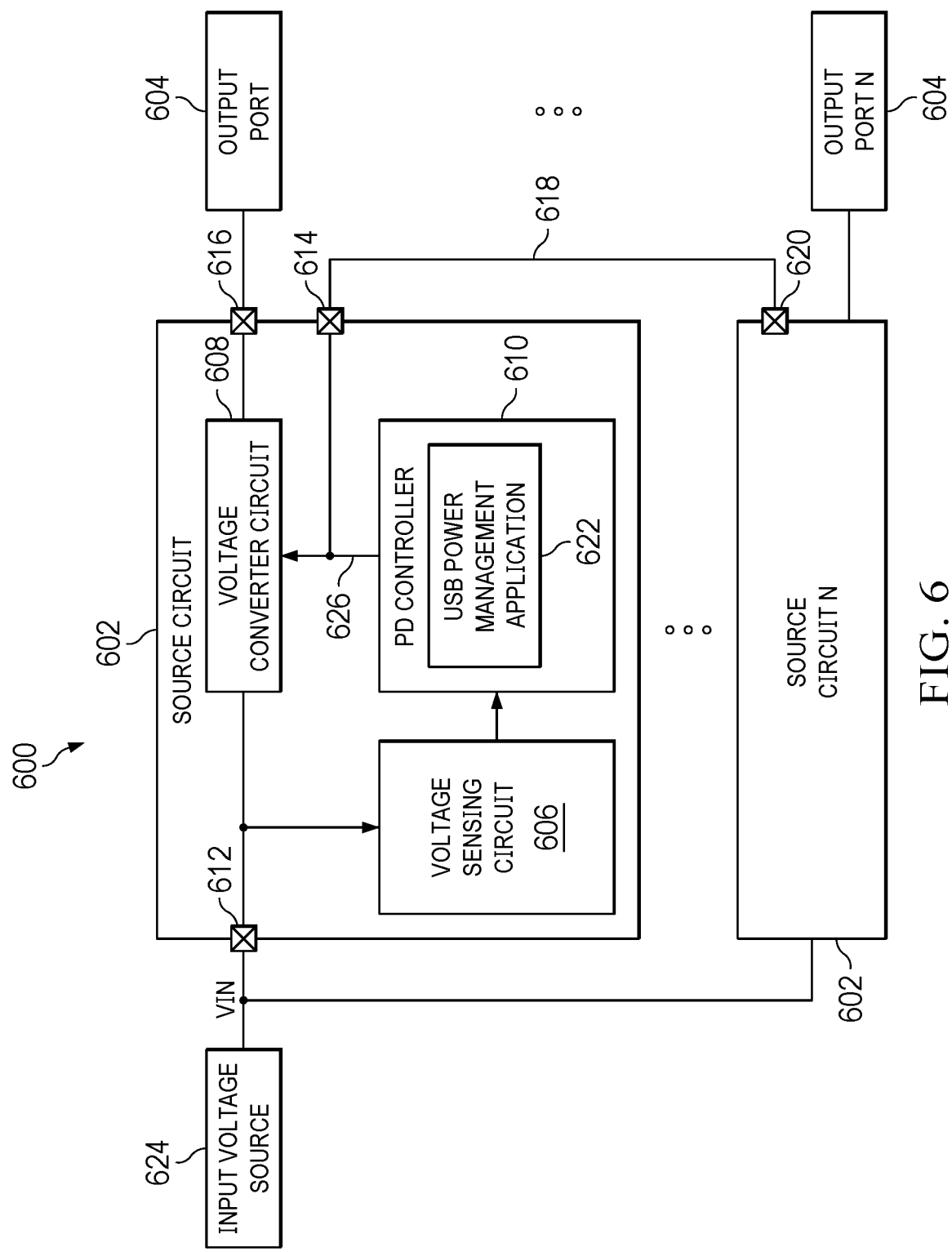
FIG. 6 is a block diagram of a further USB connector system.

FIG. 6 is a block diagram of a USB connector system 600 with an N number of source circuits 602 and an N number of output ports 604, wherein N is an integer value equal to or greater than two. For example, each of the N number of source circuits 602 can be configured similar to the source circuit 106, as shown in FIG. 1, or the source circuit 502, as shown in FIG. 5. For example, a respective source circuit of the source circuits 602 is configured with a voltage sensing circuit 606, a voltage converter circuit 608, and a PD controller 610. An input of the voltage sensing circuit 606 is coupled to an input terminal 612 of the respective source circuit. The input of the voltage sensing circuit 606 can be coupled to a first input of the voltage converter circuit 608 and an output of the voltage sensing circuit 606 can be coupled to an input of the PD controller 610. An output of the PD controller 610 can be coupled to a second input of the voltage converter circuit 608 and a first output terminal 614. An output of the voltage converter circuit 606 can be coupled to a second output terminal 616. As shown in FIG. 6, the first output terminal 614 can be coupled via a coupling element 618 (e.g., a wire, a trace, and the like) to an input terminal 620 of at least one other source circuit of the source circuit 602.

The PD controller 610 can be configured similar to the PD controller 112, as shown in FIG. 1. To mitigate the effects of vehicle transition conditions, such as engine start and stop conditions, the PD controller 610 implements a USB power management application 622 based on the input voltage VIN, as described herein. For example, the PD controller 610 is configured to control a power delivery mode of the source circuit 502 based on the input voltage VIN received at the input terminal 612 responsive to vehicle transition conditions, as described herein. The input voltage VIN can be provided by an input voltage source 624. The input voltage source 624 can be a car battery. For example, the USB power management application 622 can be programmed to control the PD controller 610 to operate in a full power delivery mode for a first timer duration (e.g., the first timer duration 206, as shown in FIG. 2) of a first timer (e.g., the first timer 152, as shown in FIG. 1) based on the input voltage VIN, as described herein. The USB power management application 622 can be programmed to control the PD controller 610 to operate in the full power delivery mode based on the input voltage VIN responsive to a vehicle transition condition (e.g., an engine start condition). In another example, the USB power management application 622 is programmed to control the PD controller 610 to operate in a low power delivery mode for a second timer duration (e.g., the second timer duration 208, as shown in FIG. 2) of a second timer (e.g., the second timer 154, as shown in FIG. 1) based on the input voltage VIN, as described herein. The USB power management application 622 can be programmed to control the PD controller 610 to operate in the low power delivery mode based on the input voltage VIN responsive to the vehicle transition condition (e.g., an engine stop condition). As another example, the USB power management application 622 is programmed to control the PD controller 610 to operate in a no power delivery mode responsive to the expiration of the second timer.

For example, the respective source circuit of the source circuits 602 is configured as a master source circuit and at least one remaining source circuit of the source circuits 602 can be configured as a slave source circuit. The PD controller 610 of the master source circuit can be configured to communicate a converter operating signal 626 responsive to determining a respective power delivery mode for the master source circuit, as described herein. The converter operating signal 626 can identify a respective current and voltage level for configuring the voltage converter circuit 608 to deliver power at a respective power level to the respective output port 604 for a respective power delivery mode. For example, the converter operating signal 626 is the converter operating signal 138, as shown in FIG. 1, or the converter operating signal 526 or 528, as shown in FIG. 5. As shown in FIG. 5, the converter operating signal 626 is provided to the first output terminal 614. For example, the first output terminal 614 is the output terminal 140, as shown in FIG. 1. The converter operating signal 626 can be communicated to each slave source circuit through the coupling element 618 to the input terminal 620.

The slave source circuit can include a PD controller that can be coupled to the input terminal 620 to receive the converter operating signal 624. The PD controller of the slave source circuit can be configured to control a respective slave source circuit to operate in a similar power delivery mode as the master source circuit based on the converter operating signal 624. For example, at least one slave source circuit does not include the PD controller, and the converter operating signal 626 can be provided to a voltage converter circuit of the at least one slave source circuit from the input terminal 620 for power delivery configuration (e.g., programming) of the voltage converter circuit, such that the at least one slave circuit operates in a similar power delivery mode as the master source circuit. For example, the source circuits 602 are configured in a master-slave configuration, such that a respective source circuit can control a power delivery mode of at least one slave source circuit based on input voltage fluctuations, which can be caused by vehicle transition conditions.

Figure 7:
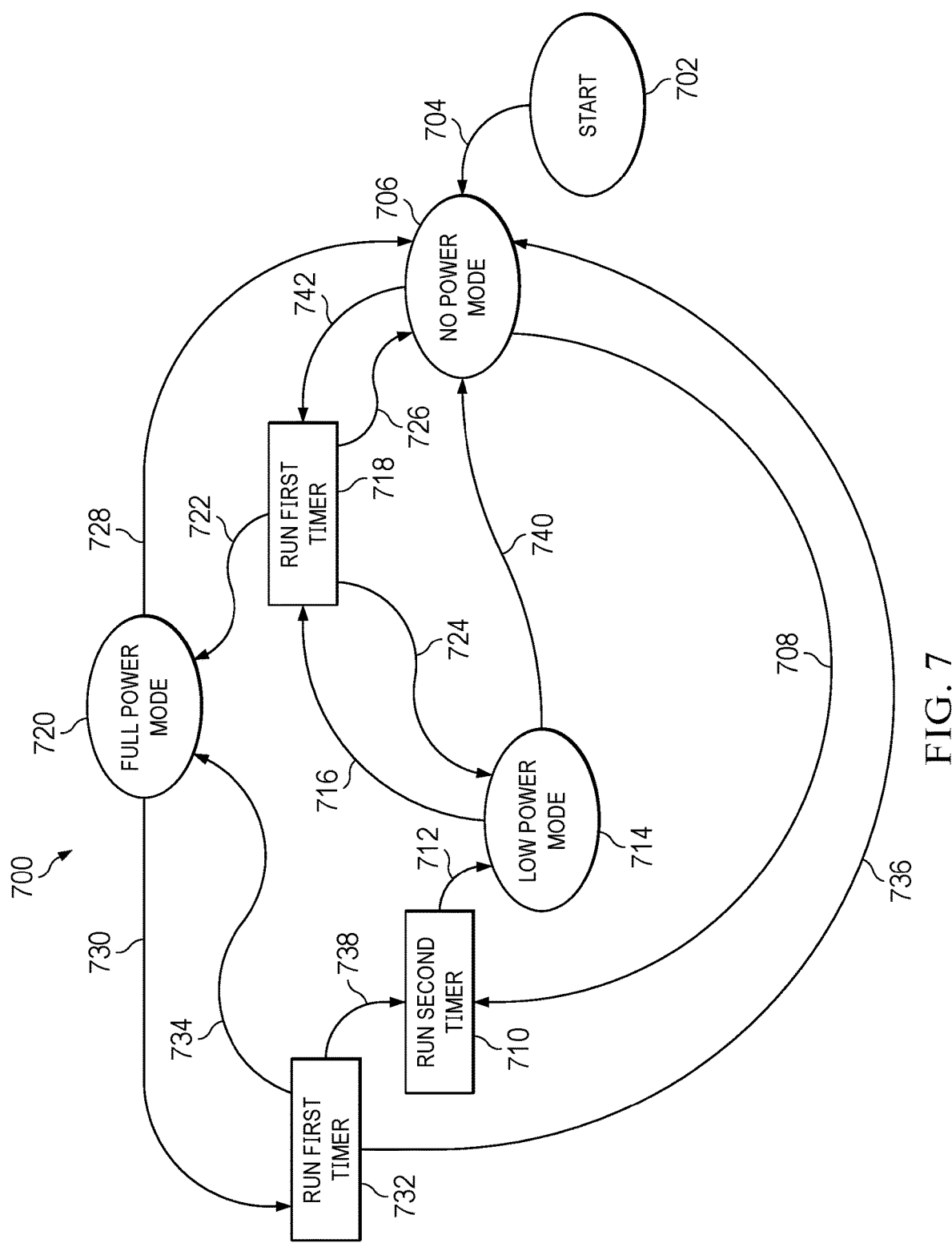
FIG. 7 is an example of a state diagram showing operations of a source circuit with respect to vehicle transition conditions.

FIG. 7 is an example of a state diagram 700 showing operations of a source circuit with respect to vehicle transition conditions. The state diagram provides a useful example of a state machine that may be used in any of the source circuits described herein, namely, the source circuit 106, as shown in FIG. 1, the source circuit 502, as shown in FIG. 5, or to at least one source circuit 602, as shown in FIG. 6. Therefore, the description of FIG. 7 refers back to FIGS. 1, 5, and 6. At 702, the source circuit can be activated, such as responsive to the input voltage VIN being equal to the PD input voltage operating threshold, as shown in FIG. 2. Responsive to being activated, internal circuitry (e.g., the PD controller 112, the voltage converter circuit 114, and the voltage sensing circuit 116, as shown in FIG. 1) can be powered up. For example, a PD controller is configured to receive samples of the input voltage VIN from a voltage sensing circuit. The PD controller can be the PD controller 112, as shown in FIG. 1, the PD controller 514, as shown in FIG. 5, or the PD controller 610, as shown in FIG. 6. The voltage sensing circuit can be the voltage sensing circuit 116, as shown in FIG. 1, the voltage sensing circuit 508, as shown in FIG. 5, or the voltage sensing circuit 606, as shown in FIG. 6. The PD controller can be configured to evaluate the sampled input voltage VIN based on threshold data (e.g., the threshold data 148, as shown in FIG. 1) and responsive to timer data (e.g., the timer data 150, as shown in FIG. 1). For example, the threshold data includes the first input voltage threshold, the second input voltage threshold, and the third input voltage threshold, for example, as shown in FIG. 2. The timer data can include a first timer duration (e.g., the first timer duration 206, as shown in FIG. 2) and a second timer duration (e.g., the second timer duration 208, as shown in FIG. 2).

For example, an SPM module (e.g., the SPM module 146, as shown in FIG. 1) may transition at 704 to control the PD controller to operate in the no power delivery mode 706. In the no power delivery mode, the source circuit provides no power to a source-side receptacle for a sink device. The source-side receptacle can be the source-side receptacle 108, as shown in FIG. 1, the first output port 504, as shown in FIG. 5, the second output port 506, as shown in FIG. 5, or at least one output port 604, as shown in FIG. 6). The sink device can be the sink device 104, as shown in FIG. 1. The SPM module may transition at 708 to activate (e.g., run) at 710 a second timer responsive to determining that the input voltage VIN is greater than or equal to a first input voltage threshold (e.g., the first input voltage threshold, as shown in FIG. 2) and less than the third threshold. As described herein, the SPM module can be programmed to evaluate the input voltage VIN sampled during a time duration of the second timer (e.g., the second time duration 208, as shown in FIG. 2) to control the power delivery mode of the source circuit.

The SPM module may transition at 712 to control the PD controller to operate in a low power delivery mode 714 responsive to determining that the input voltage VIN sampled during the time duration of the second timer is greater than the first input voltage threshold but is less than or equal to the second input voltage threshold. For example, the SPM module may transition at 716 to activate (e.g., run) at 718 a first timer responsive to determining that the input voltage VIN sampled during the time duration of the second timer is equal to the third input voltage threshold. As described herein, the SPM module can be programmed to evaluate a respective sample of the input voltage VIN sampled during a time duration of the first timer (e.g., the first timer duration 206, as shown in FIG. 2) to determine whether the source circuit is to continue operating in the low power delivery mode 714 or transition to operate to a full power delivery mode 720. In the full power delivery mode 720, the source circuit is configured to provide a greater amount of power to the source-side receptacle and thus to the sink device than in the low power delivery mode or a no power delivery mode.

The SPM module may transition at 722 to control the PD controller to operate in the full power delivery mode 720 responsive to determining that the respective sample of the input voltage VIN sampled during the time duration of the first timer is greater than the third input voltage threshold. The SPM module may transition at 724 to control the PD controller to operate in the low power delivery mode 714 responsive to determining that the respective sample of the input voltage VIN sampled during the time duration of the first timer is less than the third input voltage threshold but is greater than the first input voltage threshold. The SPM module may transition at 726 to control the PD controller to operate in the no power delivery mode 706 responsive to determining that the respective sample of the input voltage VIN sampled during the time duration of the first timer is less than or equal to the first input voltage threshold. In the no power delivery mode 706, the source circuit is configured to provide no power, and thus less power than the source circuit being operated in the low power delivery mode.

For example, the SPM module may transition at 726 to control the PD controller to operate in the no power delivery mode 706 responsive to determining that the respective sample of the input voltage VIN sampled while the source circuit is operating in the full power delivery mode 720 is less than or equal to the first input voltage threshold. For example, the SPM module may transition at 730 to activate (e.g., run) at 732 the first timer responsive to determining that the respective sample of the input voltage VIN sampled while the source circuit is operating in the full power delivery mode 720 is less than the second input voltage threshold but is greater than the first input voltage threshold. For example, the SPM module may transition at 734 to control the PD controller to operate in the full power delivery mode 720 responsive to determining that the respective sample of the input voltage VIN sampled during the time duration of the first timer is greater than the second input voltage threshold.

For example, the SPM module may transition at 736 to control the PD controller to operate in no power delivery mode 706 responsive to determining that the respective sample of the input voltage VIN sampled during the time duration of the first timer is less than the first input voltage threshold. For example, the SPM module may transition at 738 to activate at 710 the second timer responsive to determining that the respective sample of the input voltage VIN sampled during the time duration of the first timer is greater than the first input voltage threshold but is less than or equal to the second input voltage threshold. The SPM module may transition at 712 to control the PD controller to operate in the low power delivery mode 714 responsive to determining that the respective sample of the input voltage VIN sampled during the time duration of the second timer is greater than the first input voltage threshold but is less than or equal to the second input voltage threshold. For example, the SPM module may transition at 740 to control the PD controller to operate in the no power delivery mode responsive to determining that the respective sample of the input voltage VIN sampled during the time duration of the second timer is less than the first input voltage threshold. For example, the SPM module may transition at 742 to activate at 718 the first timer responsive to determining that the respective sample of the input voltage VIN sampled during the time duration of the second timer is greater than the third input voltage threshold.

As used herein, the term "circuit" can include a collection of active and/or passive elements that perform an electronic circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. For example, circuitry of a source circuit (e.g., a voltage converter circuit, a voltage sensing circuit, a PD controller, and the like) can be implemented on a semiconductor substrate. Also, in this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

In this description and the claims, the term "based on" means based at least in part on.

Modifications are possible in the described embodiments, and other embodiments are possible, within the scope of the claims.

What is claimed is:

1. A system comprising:
a voltage sensing circuit configured to determine a voltage level represented by a sense signal; and
a power delivery (PD) controller coupled to the voltage sensing circuit, the PD controller having a control input and a control output, the PD controller configured to:
receive data representing a first voltage threshold, a second voltage threshold, and a third voltage threshold, in which the third voltage threshold is higher than the first voltage threshold, and the second voltage threshold is between the first and third voltage thresholds;
responsive to detecting a rising edge of the voltage level:
if the voltage level is below the first voltage threshold, provide a first control signal at the control output, in which the first control signal represents a first level of power; and
if the voltage level is between the first voltage threshold and the third voltage threshold, provide a second control signal at the control output, in which the second control signal represents a second level of power higher than the first level of power; and
responsive to detecting a falling edge of the voltage level and the voltage level falling below the second voltage threshold, provide the first control signal and start a timer.

2. The system of claim 1, further comprising:
an input terminal;
an output terminal; and
a voltage converter circuit having a converter power input, a converter control input, and a converter power output, the converter power input coupled to the input terminal, the converter control input coupled to the control output, and the converter power output coupled to the output terminal,
wherein the voltage level is of a voltage signal at the input terminal; and
wherein the voltage converter circuit is configured to provide the first and second level of power at the output terminal responsive to the respective first and second control signals at the converter control input, and responsive to the voltage signal at the converter power input.

3. The system of claim 2, the voltage sensing circuit having a sense input and a sense output, the sense input coupled to the input terminal and the sense output coupled to the control input, the voltage sensing circuit configured to sample the voltage signal at the sense input and provide the sense signal at the sense output representing a digital version of the sampled voltage signal.

4. The system of claim 2, wherein the voltage converter circuit is configured to provide the first and second levels of power at the converter power output responsive to the respective first and second control signals at the converter control input, and responsive to the voltage signal at the converter power input.

5. The system of claim 2, wherein:
the output terminal is a first output terminal;
the voltage converter circuit is a first voltage converter;
the converter power input is a first converter power input;
the converter control input is a first converter control input;
the converter power output is a first converter power output; and
the system further comprises:
a second output terminal; and
a second voltage converter circuit having a second converter power input, a second converter control input, and a second converter power output, the second converter power input coupled to the input terminal, the second converter control input coupled to the control output, and the second converter power output coupled to the second output terminal, the second voltage converter circuit configured to provide the first and second level of power at the second output terminal responsive to the respective first and second control signals at the second converter control input, and responsive to the voltage signal at the second converter power input.

6. The system of claim 1, wherein the PD controller is configured to:
responsive to the voltage level rising above the third voltage threshold, start the timer; and
responsive to an expiration of the timer and the voltage level being above the third voltage threshold, provide a third control signal at the control output, in which the third control signal represents a third level of power higher than the second level of power.

7. The system of claim 1, wherein the PD controller is configured to:
responsive to an expiration of the timer and the voltage level being below the second voltage threshold, provide the first control signal at the control output.

8. The system of claim 7, wherein the timer is a first timer, and the PD controller is configured to:
responsive to the expiration of the first timer, start a second timer; and
responsive to an expiration of the second timer and the voltage level being below the second voltage threshold, provide a third control signal at the control output, in which the third control signal represents a third level of power lower than the first level of power.

9. The system of claim 8, wherein the PD controller is configured to provide the third control signal at the control output after the second timer expires.

10. The system of claim 9, wherein the PD controller is configured to provide the third control signal at the control output responsive to detecting the rising edge of the voltage level and the voltage level being below the first voltage threshold.

11. The system of claim 9, wherein the PD controller includes:
a memory configured to store:
threshold data representing the first through third voltage thresholds; and
instructions; and
wherein the controller is configured to execute the instructions to provide one of the first, second, or third control signals at the control output responsive to the sense signal at the control input.

12. The system of claim 1, wherein the PD controller is a universal serial bus (USB) PD controller.

13. A circuit comprising:
a voltage sensing circuit having a sense input and a sense output, the voltage sensing circuit configured to sample a first voltage signal at the sense input and provide a sense signal at the sense output representing a digital version of the sampled first voltage signal; and
a power delivery (PD) controller having a control input and a control output, the control input coupled to the sense output, and the PD controller configured to:
receive data representing a first voltage threshold, a second voltage threshold, and a third voltage threshold, in which the third voltage threshold is higher than the first voltage threshold, and the second voltage threshold is between the first and third voltage thresholds;
responsive to the sense signal at the control input, determine a first voltage level of the first voltage signal;
responsive to the sense signal indicating a rising edge of the first voltage level:
if the first voltage level is below the first voltage threshold, provide a first control signal at the control output, in which the first control signal represents a first level of power; and
if the first voltage level is between the first voltage threshold and the third voltage threshold, provide a second control signal at the control output, in which the second control signal represents a second level of power higher than the first level of power; and
responsive to the sense signal indicating a falling edge of the first voltage level and the first voltage level falling below the second voltage threshold, provide the first control signal and start a timer; and
a voltage converter circuit having a converter voltage input, a converter control input, and a converter voltage output, the converter voltage input coupled to the sense input, the voltage converter circuit configured to, responsive to the first voltage signal at the converter voltage input and the first or second control signals at the converter control input, provide a second voltage signal having the respective first or second level of power at the converter voltage output.

14. The circuit of claim 13, wherein the PD controller is configured to:
responsive to the sense signal indicating that the first voltage level rising above the third voltage threshold, start the timer; and
responsive to an expiration of the timer and the sense signal indicating that the first voltage level is above the third voltage threshold, provide a third control signal at the control output, in which the third control signal represents a third level of power higher than the second level of power; and
wherein the voltage converter circuit is configured to, responsive to the third control signal, provide the second voltage signal having the third level of power.

15. The circuit of claim 13, wherein the PD controller is configured to:
responsive to an expiration of the timer and the sense signal indicating that the first voltage level is below the second voltage threshold, provide the first control signal at the control output.

16. The circuit of claim 15, wherein the timer is a first timer, and the PD controller is configured to:
responsive to the expiration of the first timer, start a second timer; and
responsive to an expiration of the second timer and the sense signal indicating that the first voltage level is below the second voltage threshold, provide a third control signal at the control output, in which the third control signal represents a third level of power lower than the first level of power; and
wherein the voltage converter circuit is configured to, responsive to the third control signal, provide the second voltage signal having the third level of power.

17. The circuit of claim 16, wherein the PD controller is configured to provide the first control signal at the control output responsive to the sense signal indicating the rising edge of the first voltage level and the first voltage level being below the first voltage threshold.

18. The circuit of claim 13, wherein the PD controller is a USB PD controller.

19. A method performed by a power delivery (PD) controller, the method comprising:
receiving data representing a first voltage threshold, a second voltage threshold, and a third voltage threshold, in which the third voltage threshold is higher than the first voltage threshold, and the second voltage threshold is between the first and third voltage thresholds;
determining a voltage level represented by a sense signal at a control input of the PD controller;
responsive to detecting a rising edge of the voltage level:
if the voltage level is below the first voltage threshold, provide a first control signal, in which the first control signal represents a first level of power; and
if the voltage level is between the first voltage threshold and the third voltage threshold, provide a second control signal, in which the second control signal represents a second level of power higher than the first level of power; and
responsive to detecting a falling edge of the voltage level and the voltage level falling below the second voltage threshold, provide the first control signal and start a timer.

* * * * *